(12) United States Patent
Janssen et al.

(10) Patent No.: US 9,675,086 B2
(45) Date of Patent: Jun. 13, 2017

(54) SKINNING DEVICE FOR REMOVING SKIN FROM AN ANIMAL CARCASS PART WHEN CONVEYED BY A CONVEYOR MEANS

(71) Applicant: MAREL MEAT PROCESSING B.V., Boxmeer (NL)

(72) Inventors: Cornelis Joannes Janssen, Holthees (NL); Franciscus Theodorus Henricus Johannes Van Der Steen, Megen (NL)

(73) Assignee: MAREL MEAT PROCESSING B.V., Boxmeer (NL)

( * ) Notice: Subject to any disclaimer, the term of this patent is extended or adjusted under 35 U.S.C. 154(b) by 0 days.

(21) Appl. No.: 15/026,742

(22) PCT Filed: Oct. 3, 2014

(86) PCT No.: PCT/EP2014/071259
§ 371 (c)(1),
(2) Date: Apr. 1, 2016

(87) PCT Pub. No.: WO2015/049380
PCT Pub. Date: Apr. 9, 2015

(65) Prior Publication Data
US 2016/0249628 A1    Sep. 1, 2016

(30) Foreign Application Priority Data

Oct. 4, 2013 (EP) .................................... 13187406

(51) Int. Cl.
*A22C 21/00*    (2006.01)
*A22B 5/16*    (2006.01)
*A22C 17/12*    (2006.01)

(52) U.S. Cl.
CPC .............. *A22B 5/166* (2013.01); *A22B 5/161* (2013.01); *A22C 17/12* (2013.01)

(58) Field of Classification Search
CPC ..... A22C 21/0092; A22C 17/12; A22C 25/17; A22C 5/161; A22B 5/166
(Continued)

(56) References Cited

U.S. PATENT DOCUMENTS 3,504,721 A    4/1970    Townsend
3,703,199 A    11/1972    Townsend
(Continued)

FOREIGN PATENT DOCUMENTS

EP        2018809 A1    1/2009
WO    2011074966 A1    6/2011

OTHER PUBLICATIONS

International Search Report for corresponding International PCT Application No. PCT/EP2014/071259, Oct. 28, 2014.

*Primary Examiner* — Richard Price, Jr.
(74) *Attorney, Agent, or Firm* — Workman Nydegger

(57) ABSTRACT

A skinning device for removing skin from an animal carcass or carcass parts when conveyed by a conveyor means includes a frame, a housing rotatably mounted on the frame using a rotation mechanism, a motor driven tooth roll mounted on the housing, a support structure mounted on the housing encasing at least a portion of the tooth roll, a cutting blade positioned adjacent to the support structure between the support structure and the tooth roll, and a sensing structure for sensing incoming animal carcass or carcass parts. The rotation mechanism is operably connected to the housing and adapted to execute, in response to a reaction from the sensing structure, a movement of the housing including rotational movement around a longitudinal axis of the tooth roll from a first angular position to a second angular position.

15 Claims, 4 Drawing Sheets

(58) Field of Classification Search
IPC ........ A22C 21/0092,17/12, 25/17; A22B 5/166
, 5/161
See application file for complete search history.

(56) References Cited

U.S. PATENT DOCUMENTS

| | | | | |
|---|---|---|---|---|
| 3,737,949 | A * | 6/1973 | Davis .................... | A22B 5/161 |
| | | | | 452/129 |
| 4,631,780 | A | 12/1986 | Leining | |
| 2004/0166793 | A1 | 8/2004 | Young et al. | |
| 2007/0026782 | A1* | 2/2007 | Bergman ............... | A22B 5/166 |
| | | | | 452/129 |
| 2007/0026783 | A1* | 2/2007 | Bergman ............... | A22C 17/12 |
| | | | | 452/129 |
| 2011/0300279 | A1 | 12/2011 | Black et al. | |
| 2014/0120816 | A1* | 5/2014 | Stooker .............. | A22C 21/0092 |
| | | | | 452/128 |

* cited by examiner

SKINNING DEVICE FOR REMOVING SKIN FROM AN ANIMAL CARCASS PART WHEN CONVEYED BY A CONVEYOR MEANS

FIELD OF THE INVENTION

The present invention relates to a skinning device for removing skin from an animal carcass when conveyed by a conveyor means, and to a method of removing skin from an animal carcass using such a skinning device.

BACKGROUND OF THE INVENTION

Skinning device for removing skin from an animal carcass, in particular pork, is one of the challenges within the field of meat processing.

Considerable development has been made in the last decades within this field where hand held skinners such as the one disclosed in U.S. Pat. No. 4,631,780 has been developed, as well as stationary skinners as disclosed in U.S. Pat. No. 3,504,721 and U.S. Pat. No. 3,703,199.

These stationary skinners however require a manual labour to move the animal carcass/carcass part over the skinning device while the skin is being removed therefrom. Also, the fact that the surface of the animal carcass/carcass part can be very irregular limits the throughput because the operator must move the animal carcass/carcass part several times through the stationary skinner. Also, some fat is removed simultaneously with the skin removal which affects the yield of the processing because fat is typically worth more than the skin. Moreover, the above mentioned stationary skinners require that manual labor is present at all times.

The inventor of the present invention has appreciated that there is thus a need for an improved skinning device, preferred embodiments of which provide higher throughput and yield and has in consequence devised the present invention.

SUMMARY OF THE INVENTION

It is an object of embodiments of the invention to provide an improved skinning device that does no longer require manual interference or at least reduces the need of manual labor work. It is a further object of embodiments of the invention to provide a skinning device, which is capable of removing skin from an animal carcass with minimum amount of fat. In general, the invention preferably seeks to mitigate, alleviate or eliminate one or more of the above mentioned disadvantages of the prior art singly or in any combination. In particular, it may be seen as an object of embodiments of the present invention to provide a skinning device that solves the above mentioned problems, or other problems.

To better address one or more of these concerns, in a first aspect of the invention a skinning device is provided for removing skin from an animal carcass or carcass parts when conveyed by a conveyor means, the carcass or each carcass part being preferably moved over the skinning device so that it optionally at least partially rests thereon while being conveyed, comprising:
a frame,
a housing rotatably mounted on the frame using a rotation mechanism,
a motor driven tooth roll continuously rotable around an axis of rotation,
a support structure mounted on the housing encasing at least a portion of the tooth roll,
a cutting blade positioned between the support structure and the tooth roll in a fixed position in relation to the support structure, and
a sensing structure for sensing incoming animal carcass or carcass parts,
wherein the rotation mechanism is operably connected to the housing and adapted to execute, in response to a reaction from the sensing structure, a movement of the housing including rotational movement around a longitudinal axis of the tooth roll from a first angular position to a second angular position, the first angular position being a starting position where the tooth roll, during operation of the device, engages the skin of an incoming animal carcass or carcass part and pulls the skin towards the cutting blade when the tooth roll is continuously rotated around its axis of rotation, where subsequently the housing is moved from the first angular position towards the second angular position such that the animal carcass or carcass part is moved over the skinning device while the skin is being pulled between the support structure and the tooth roll causing simultaneous removal of the skin from the animal carcass or carcass part upon reaching the second angular position.

Accordingly, a skinning device is provided, which may operate in a fully automated manner, i.e. without manual labor interaction where the throughput of the skin removal processing is greatly increased.

Due to the movement of the housing from the first angular position towards the second angular position, where the animal carcass or carcass part is moved over the skinning device, or is moved over the cutting blade and the support structure of the skinning device, it is ensured that minimum amount of fat will be left on the skin after removing it from the animal carcass or carcass part, which makes the processing more profitable considering the fact that the price of fat is typically higher than the price of skin.

More importantly, thanks to the fact that the skinning device rotates as the animal carcass or carcass part is conveyed or rolled over it, i.e. rotates away from the first angular position towards the second angular position in a clockwise direction (seen from a side view where the conveying direction is from left to right), it is ensured that the whole skin that is in physical contact with the skinning device while the animal carcass or carcass part is moved over the skinning device will be removed.

The animal carcass or carcass part may as an example be, but is not limited to, slaughtered pigs, notably leg parts, hams, and shoulder parts of pigs.

The tooth roll may also be mounted on the housing such as in a rotatable manner so that when changing the angular position form the first angular position to the second angular position, or vice versa, also the angular position of the motor driven tooth roll is also being changed (in addition to the rotational movement of the tooth roll).

Also, in one embodiment of the claimed invention, the angular position of only the support structure and the cutting blade from the first angular position to the second angular position, or vice versa, may be changed relative to the motor driven tooth roll so that the support structure and the cutting blade move relative and along the arc of the tooth roll.

The cutting blade may in one embodiment be mounted to the housing, or be mounted to the support structure.

The term "reaction" may stand for a physical reaction that triggers the above mentioned movement of the housing, e.g. the incoming animal carcass or carcass parts by exert with a gravitational force on a lever arm, a handle and the like, that is coupled to the rotation mechanism. The term "reaction" may also stand for a signal, e.g. an electrical or wireless signal, that triggers that above mentioned movement of the housing, where the rotation mechanism may comprise an input means, e.g. a receiver unit, for receiving the signal and based thereon execute that movement of the housing.

In one embodiment, the rotation mechanism is further adapted to, in response to a control command, to execute a movement of the housing to a third angular bypass position prior to engaging with an incoming animal carcass or carcass part, the third angular bypass position being a position where a cutting edge of the cutting blade does not engage with the incoming animal carcass or carcass part. This is of particular importance where one of several processing steps are to be left out or bypassed, i.e. where no processing is to take place, but this may be based on a pre-order where e.g. incoming carcass or carcass parts are to be processed differently based on orders from customers.

An incoming carcass or carcass part may have associated processing data indicating how to process it, but this could include that this particular carcass or carcass part shall not be skinned. In such instances, a control unit that e.g. controls the skinner may receive a control command indicating that this incoming carcass or carcass part is not to be skinned. This third angular bypass position may be achieved by rotating the skinner in a clockwise direction (seen from a side view where the conveying direction is from left to right) where an incoming carcass or carcass part does not come into contact with the cutting blade. The carcass or carcass parts may be traced or tracked at all times meaning that the position of the carcass or carcass parts is known at all times. Thus, when e.g. a particular carcass part is not to be skinned based on data associated to this particular carcass part, the positional related data may trigger this rotating of the skinner to move to the third angular position.

In one embodiment, the sensing structure comprises a lever arm adapted to, upon coming into contact with an incoming animal carcass or carcass part, trigger the rotation mechanism to move the housing from a second angular position back to a first angular starting position. Thus, a simple mechanical solution is provided to trigger the angular movements of the skinner device. Other solutions are obviously also possible to trigger these angular movements of the skinner, e.g. crossing a laser beam may trigger this movement, or other types of sensing means may be utilized to trigger such an angular movement.

In one embodiment, the support structure extends along and in proximity to the motor driven tooth roll and comprises an elongated narrow end positioned adjacent to the tooth roll pointing opposite to the rotational direction of the tooth roll, and where the cutting blade is mounted to the support structure such that it protrudes outwardly from the elongated narrow end in a direction substantially tangentially to a circumference of the tooth roll.

In one embodiment, the support structure comprises a shoe having an arc-shape essentially following the shape of the motor driven tooth roll, and a clamp mounted to the shoe, where at least one of the shoe and the clamp comprises a groove, and where a portion of the cutting blade is positioned or clamped in the groove between the clamp and the shoe. Thus, a simple solution is provided to mount the cutting blade in a fixed position in relation to the support structure. Also, the cutting blade(s) may easily be replaced simply by unfasten the clamp from the shoe.

In one embodiment, the rotation mechanism comprises a rotation axis operably connected to a rotation axis of the motor driven tooth roll or that is an integral part of the axis of the motor driven tooth roll, a pneumatic or hydraulic system comprising a piston that is slidable mounted to a housing for providing back and forth movement of the piston and a connection member connecting the piston to the rotation axis such that the back and forth movement of the piston becomes transferred to a rotational movement of the housing. Thus, a simple solution is provided for performing the above mentioned movement of the housing.

In one embodiment, the motor driven tooth roll comprises plurality of tooth wheels arranged in axially spaced apart arrangement with a mutual distance between adjacent tooth wheels to define a space there between, where the tooth wheels have circumferentially arranged teeth projecting outwardly therefrom so as to facilitate the pulling of the skin from the animal carcass or carcass part towards the cutting blade.

In one embodiment, the skinning device further comprises plurality of strippers arranged in the space between the tooth wheels and that at least party circumferentially surround the space between adjacent tooth wheels, each of the plurality of strippers comprises a tail part pointing distally away from the motor driven tooth roll and the support structure so as to guide the skin removed from the animal carcass or carcass part away from the skinner device. It is thus prevented that the skin does not get stuck in the motor driven tooth roll but instead is guided away from the skinning device.

In one embodiment, the skinning device further comprises an arc shaped plate structure essentially following the circumferential contour of the motor driven tooth roll and being positioned or mounted in front and adjacent to the motor driven tooth roll and the cutting blade, the arc-shaped plate structure being adapted to limit the skin removal of the incoming carcass or carcass part as the housing moves from the first angular position to the second angular position. It is thus possible to restrict the part of the incoming animal carcass or carcass part, i.e. restrict the de skinned part. As an example, it is possible to perform cascade skinning meaning where if e.g. the incoming animal carcass or carcass part is a shoulder part of a pork one may first want to de skin the neck part to a certain level. Subsequently, the shoulder may be advanced to a second skinning device for de skinning the shoulder, but this second skinning device may be similar or identical to the skinning device according to the present invention, but may be adjusted under a different angle. Accordingly, the arc shaped plate structure provides de skinning limitations, or restricted or defined skinning.

For example, if the incoming animal carcass or carcass part is a complete shank of a pork, and the aim is to produce Eisbein, it is now possible to prevent the skinning device from damaging the skin on this part of the shoulder, i.e. only the lower part of the shank will be de skinned. Accordingly, it is possible to restrict the functionality of the skinning device to specific traject, in this case to the lower part of the shank.

The arc shaped plate structure may be attached to the skinning device in e.g. a hinge like manner so as to facilitate the "activation" (partly prevent the skinning) or "de-activation" (none preventing of the skinning) of it, or it may be slidable mounted to the skinning device where it may slide back and forth along the tooth roll on e.g. sliding track or similar means. This may facilitate the exact placement of the arc shaped plate structure along the skinning device by e.g. an operator, or this position may be semi or fully automatic where e.g. a control unit may based on received placement command adjust the placement of the arc shaped plate structure automatically. The arc shaped plate structure may also be rotatable mounted to the skinning device where it may be slide around a longitudinal axis of the motor driven tooth roll where it may be moved in front and adjacent to the motor driven tooth roll and thus partly preventing to motor driven tooth roll to engage with an incoming animal carcass or carcass part where the arc shaped plate structure is position, and be moved away from it. This may be steered by an indicator where this "activation" or "de activation" of the arc shaped plate structure may be operated for e.g. per shoulder, per farmer or per species based e.g. on pre-orders.

The width of the arc shaped plate structure is significantly less that the length of the motor driven tooth roll, e.g. if the length of the motor driven tooth roll is between 40-70 cm, the width of this arc shaped plate structure may be in the range of 5-15 cm.

In a second aspect of the invention, a method is of skinning an incoming animal carcass or carcass part is provided in the above mentioned skinning device, comprising:

positioning the housing in the first angular position, where upon that the tooth roll engages the skin of an incoming animal carcass or carcass part and pulls it towards the cutting blade, moving the housing from the first angular position towards the second angular position such that the tooth roll and the cutting blade is in continuous physical contact with the animal carcass or carcass part while simultaneously removing the skin therefrom during the moving from the first angular position towards the second angular position, and moving the housing from the second angular position back to the first angular position before a subsequent animal carcass or carcass part arrives at the skinning device.

A fully automated method is thus provided for removing skin from animal carcass or carcass part efficiently where minimum amount of fat is being removed simultaneously.

Also, the fact that no manual labor interaction is needed during the skin removal does not only make the method of skinning more economical, but also prevents that injuries occur, which may easily be the case where the skinning is performed manually or semi manually.

The skinning performed by the skinning device may be just one of several processing steps performed at plurality of processing stations arranged along the track, where each of the processing stations are adapted to carry out one or more processing steps on the animal carcass or carcass parts including the skinning of the animal carcass or carcass parts.

In one embodiment, the method further comprises, in response to a control command to bypass an incoming carcass or carcass part from skinning, adjusting the angular position of the skinning device to a third angular bypass position prior to engaging with subsequent incoming animal carcass or carcass part, the third angular position being a bypass position where the cutting edge of the cutting blade does not engage with the incoming animal carcass or carcass part. A method is thus provided where the decision of whether skinning shall take place or not part may be controlled, but some customers may prefer to keep the skin on the animal carcass or carcass part, while other customers may prefer that the skin is removed.

In one embodiment, the step of wherein moving the housing from the second position back to the first position is triggered via a physical contact between an incoming animal carcass or carcass part with the lever arm of the sensing structure of the skinning device.

In one embodiment, the first angular position is a position where the angle between a reference axis pointing opposite to the conveying direction of the animal carcass or carcass part and the cutting blade is less than 90°, such as in the range 10°-80°, preferably in the range 20°-70°, more preferably in the range of 30°-60°.

In one embodiment, the second angular position is a position where the angle between a reference axis pointing opposite to the conveying direction of the animal carcass or carcass part and the cutting blade is equal or larger than 90°, such as in the range 90°-120°, preferably in the range 100°-110°.

In one embodiment, the third angular bypass position is a position where the angle between a reference axis pointing opposite to the conveying direction of the animal carcass or carcass part and the cutting blade is larger than 90°, such as in the range 100°-180°.

These angular positions should however not be construed as being limited to these ranges.

In a third aspect of the invention, a system is provided for processing animal carcass or carcass parts including skinning the animal carcass or carcass parts, comprising:

the above mentioned skinning device, an overhead transport-conveyor system comprising:
a track,
a plurality of carriers slideable mounted to the tracks, each of the carriers being adapted to carry an animal carcass or carcass part,
a driving unit coupled to the plurality of carriers for advancing the plurality of carriers along the track, an input unit for receiving a control command including processing instructions for incoming animal carcass or carcass parts, the processing instructions including instructions specifying whether or not incoming animal carcass or carcass parts are to be skinned or not, a control unit operably connected to the rotation mechanism of the skinning device for operating the movement of the housing of the skinning device in accordance to with control command.

In one embodiment, in case the control command indicates that an incoming carcass or carcass part is not to be skinned, the control unit instructs the rotation mechanism to execute a movement of the housing to a third angular bypass position prior to engaging with the incoming animal carcass or carcass part, the third angular bypass position being a position where the cutting edge of the cutting blade does not engage with the incoming animal carcass or carcass part.

An advanced system is thus provided where the processing of animal carcass or carcass parts including the skinning of the animal carcass or carcass parts may be fully controlled and adapted to customers orders.

Traditional food processing systems/plants for e.g. pork require very much manual labour, e.g. moving leg parts, hams, and shoulder parts, from one position where one type of processing is taking place, to another position where another type of processing is taking place such as skinning. Due to how heavy these leg parts, hams, and shoulder parts are, this will obviously be difficult for the operators and may easily cause physical injuries as the time passes.

Thus, by conveying the animal carcass or carcass parts, e.g. the leg parts, hams, and shoulder parts of a pork, on such overhead transport-conveyor system, such physical injuries may be prevented. Also, it is possible to perform the various processing steps along the track of the overhead transport-conveyor system, where different operations are taking place, i.e. the above mentioned physical intervention with the animal carcass or carcass parts is no longer needed.

Moreover, that above mentioned bypass position allows skipping this particular process step, which may be based on customer orders, e.g. not to perform the de skinning processing step.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
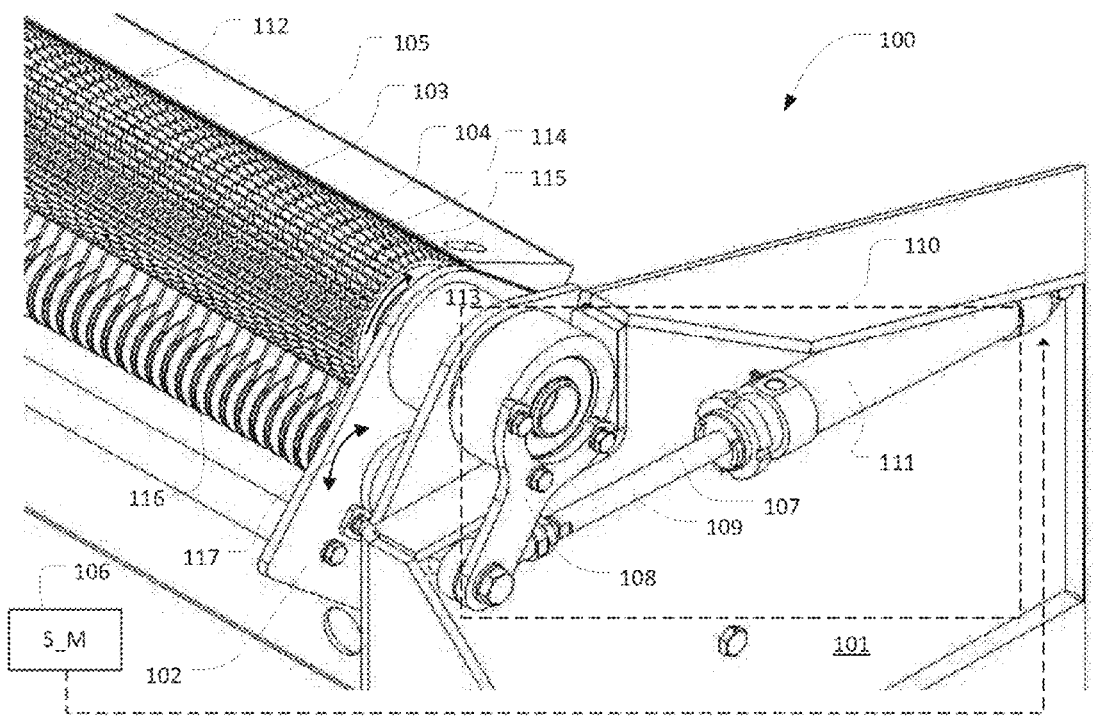
FIG. 1 depicts an embodiment of a skinning device according to the present invention for removing skin from an animal carcass or carcass part.

FIG. 1 depicts perspective view of a skinning device 100 according to the present invention for removing skin from an animal carcass or carcass parts when conveyed by a conveyor means.

The skinning device 100 comprises a frame 101, a housing 102 rotatable mounted to the frame 101 using a rotation mechanism 110, and a motor driven tooth roll 103 that may be rotatable mounted to the housing 102.

The skinning device 100 further comprises an elongated support structure 104 mounted on the housing 102 encasing at least a portion of the tooth roll 103, an elongated cutting blade 105 positioned adjacent to the support structure between the support structure 104 and the tooth roll 103 and positioned in a fixed position in relation to the support structure 104, and a sensing structure 106. As depicted here, the support structure 104 extends along and in proximity to the motor driven tooth roll 103 and comprises an elongated narrow end 112 positioned adjacent to the tooth roll 103 pointing opposite to the rotational direction of the tooth roll indicated by arrow 113, and where the cutting blade is mounted to the support structure such that it protrudes outwardly from the elongated narrow end.

The motor driven tooth roll 103 comprises plurality of tooth wheels 114, 115 arranged in axially spaced apart arrangement with a mutual distance between adjacent tooth wheels to define a space there between.

The sensing structure 106 is adapted for sensing incoming animal carcass or carcass parts.

The rotation mechanism 110 is operably connected to the housing 102 and is adapted to execute, in response to a reaction from the sensing structure, a movement of the housing 102 including rotational movement as indicated by the arrow 117 around an longitudinal axis of the tooth roll 103 from a first angular position to a second angular position, and vice versa, where the first angular position is a starting position where the tooth roll 103 engages the skin of an incoming animal carcass or carcass part and pulls the skin towards the cutting blade 105. Subsequently, the angular position is adjusted from being in the first angular position towards the second angular position such that the animal carcass or carcass part is moved over the skinning device 100 while the skin is being pulled along the arc between the support structure 104 and the tooth roll 103 causing simultaneous removal of the skin from the animal carcass or carcass part upon reaching the second angular position. This will be discussed in more details in relation to FIG. 4.

The skinning device further comprises plurality of strippers 116 placed between the adjacent tooth wheels 114, 115. This will be discussed in more details later in relation to FIG. 2.

The rotation mechanism 110 comprises a rotation axis 109 operably connected to a rotation axis of the motor driven tooth roll or that is an integral part of the rotation axis of the motor driven tooth roll, a pneumatic or hydraulic system comprising a piston 107 that is slidable mounted to a housing 111 for providing back and forth movement of the piston. A connection member 108 connects the piston 107 to the rotation axis 109 such that the back and forth movement of the piston becomes transferred to a rotational movement of the housing as indicated by the arrow 113.

Figure 2:
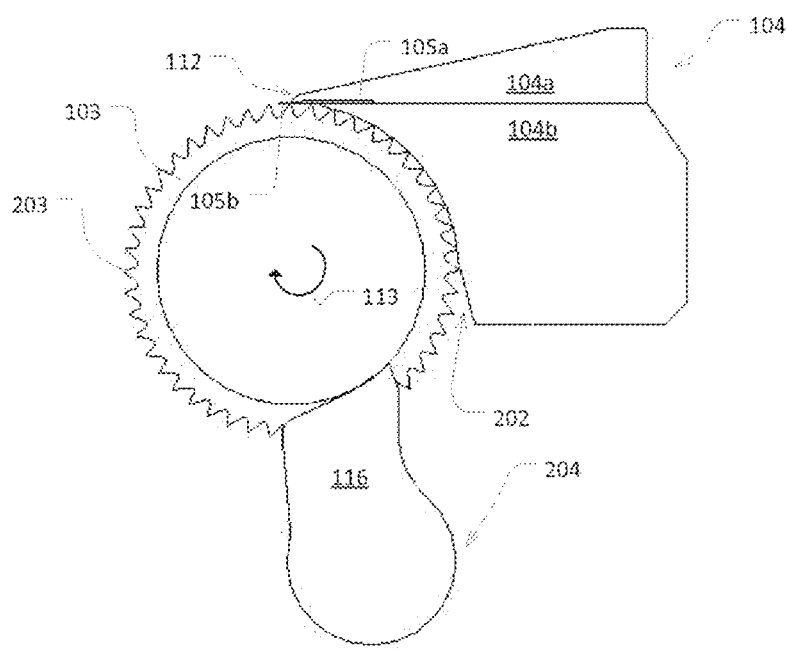
FIG. 2 shows a cross sectional side view of the skinning device shown in FIG. 1.

FIG. 2 shows a cross sectional side view of the skinning device 100 shown in FIG. 1. The support structure may as shown here comprises a shoe 104b and a clamp 104a connected to the shoe and where the elongated narrow end 112 is an integral part of the clamp 104a. Either the shoe or the clamp or both may have a groove that extends transversely from a first edge to a second edge. A portion 105a of the cutting blade is positioned or clamped in the groove between the clamp 104a and the shoe 104b and where, as already addressed, the outwardly protruding portion 105b extends outwardly therefrom opposite to the rotational direction of the motor driven tooth roll 103.

As depicted here, the support structure 104, or the shoe 104b, is shaped such that the side of the support structure facing the tooth roll 103 has an arc-shaped contour essentially following the tooth roll 103. Moreover, the support structure 104, or the shoe 104b, is shaped such that a portion 104b of it deviates away 202 from the tooth roll 103 so as to provide a guiding area for the skin that has been removed from the carcass.

FIG. 2 shows also where the tooth wheels have circumferentially arranged teeth 203 projecting outwardly therefrom so as to facilitate the pulling of the skin (not shown) towards the elongated cutting blade 105.

This side view also shows one stripper 116 selected from the plurality of strippers, but the strippers partly circumferentially surround the space between adjacent tooth wheels and comprise a tail part 204 to ensure that the skin that is being removed from the carcass or carcass part is guided away from the skinner device 100.

The strippers 116 may also be attached to the motor driven tooth wheel 103 such that they do not have any fixing points other than the enclosure around the motor driven tooth roll 103, and preferably such that each skinner has a restricted free movement, but this may help reducing friction between the strippers and the tooth roll and thus reduce the power consumption of the motor of the skinning device 100.

Figure 3:
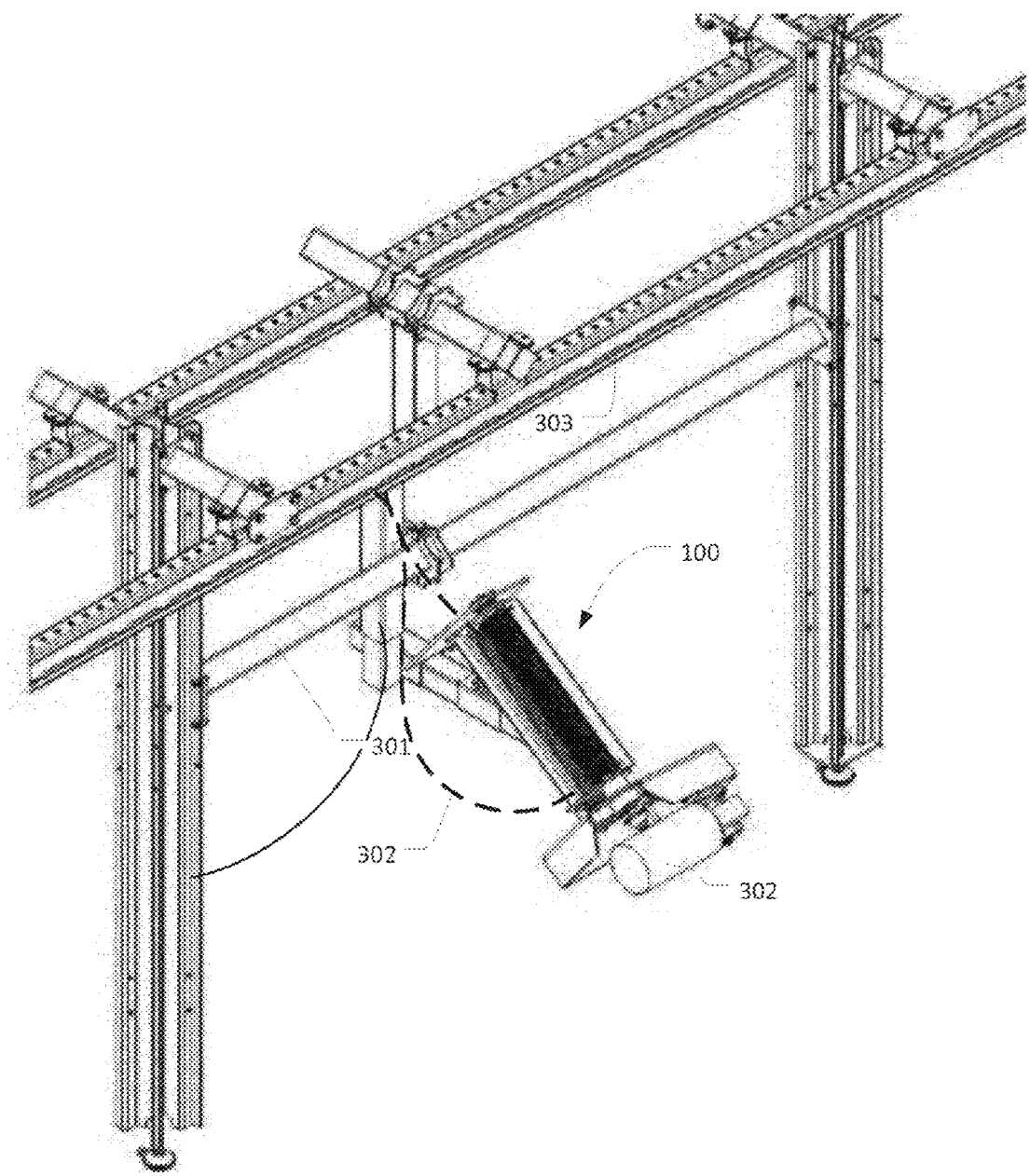
FIG. 3 shows the skinning device in FIGS. 1 and 2, where the skinning device has been mounted to a frame structure.

FIG. 3 shows the skinning device 100 in FIGS. 1 and 2, where the skinning device 100 has been mounted to a frame 301. A motor 302 is also shown to supply the power for the tooth roll and/or the power needed to execute the rotational movement of the housing.

As depicted here, the skinning device 100 may be mounted to the frame 301 in inclined way. The animal carcass or carcass part is indicated here by dotted lines 302 may be transported on rail guides 303 of an overhead transport-conveyor system via a carcass or carcass part carrier that are slideable mounted to the rail guides.

An example of such an overhead transport-conveyor system and such carriers is described in WO 2011/074966, hereby incorporated in its entirety be reference.

When the carcass or carcass part arrives at the skinning device 100 it may be vertically arranged or be somewhat inclined, so that it at least partly rests on the skinning device 100 while being conveyed, and where the skinning device executes the above mentioned movement of the housing from the first angular position to the second angular position.

FIG. 4a-d depict graphically the functioning of a skinning device according to the present invention, such as the one discussed in relation to FIGS. 1-3, when skinning an incoming carcass or carcass part 401 while being conveyed as indicated by the arrow by a conveyor means.

Figure 4A:
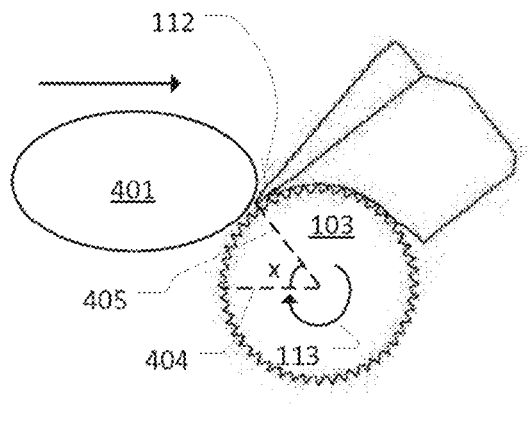
FIG. 4a-d depict graphically the functioning of a skinning device according to the present invention.

FIG. 4a shows where the rotation mechanism (not shown) of the skinning device has adjusted the angular position of the housing of the skinning device to a first angular position x<90°, which is the angle between a horizontal reference axis 404 pointing from the center of the motor driven tooth roll 103 and against the conveying direction and the axis 405 pointing from the tooth roll 103 towards the elongated narrow end 112 of the support structure. This first angular position is the starting position where the tooth roll engages the skin of an incoming animal carcass or carcass part 401 and pulls the skin towards the cutting blade. Shown is also the rotational direction of the motor driven tooth roll, indicated by the arrow 113.

Figure 4B:
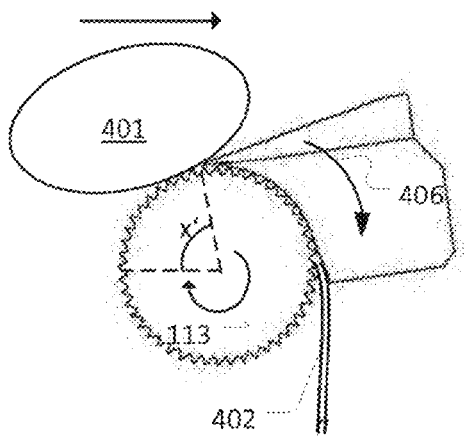

FIG. 4b shows an intermediate step during the skinning, where the rotation mechanism is adjusting the angular position of the housing from the first angular position towards the second angular position, as indicated by arrow 406, while the animal carcass or carcass part is moving over the skinning device or over the cutting blade and the support structure, while automatically removing the skin 402 from the animal carcass or carcass part 401.

Figure 4C:
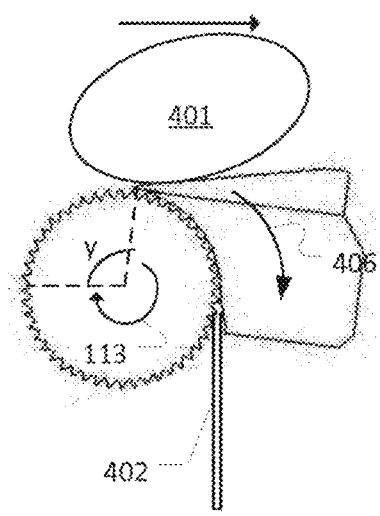

FIG. 4c shows where the housing of the skinning device has reached the second angular position y≥90°, i.e. a position where the skin 402 on the side facing the skinning device has automatically be removed from the animal carcass or carcass part 401.

Figure 4D:
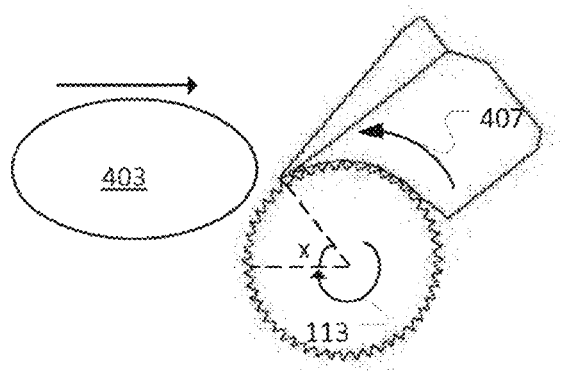

FIG. 4d shows where the rotation mechanism has rotated the housing of the skinning device back to the first angular position x, as indicted by arrow 407, where the skinning device is ready for skin removal for a subsequent incoming animal carcass or carcass part 403.

Figure 5:
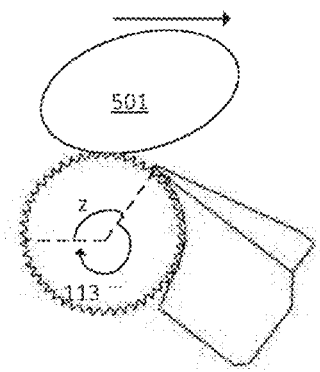
FIG. 5 shows one embodiment the rotation mechanism is further adapted to, in response to a control command, to execute a movement of the housing to a third angular bypass position.

FIG. 5 shows one embodiment the rotation mechanism is further adapted to, in response to a control command, to execute a movement of the housing to a third angular bypass position z prior to engaging with an incoming animal carcass or carcass part. This would be the position where the skin of an incoming animal carcass or carcass part 501 is not to be removed, i.e. where the incoming animal or animal carcass is to be bypassed by the skinning device.

Figure 6:
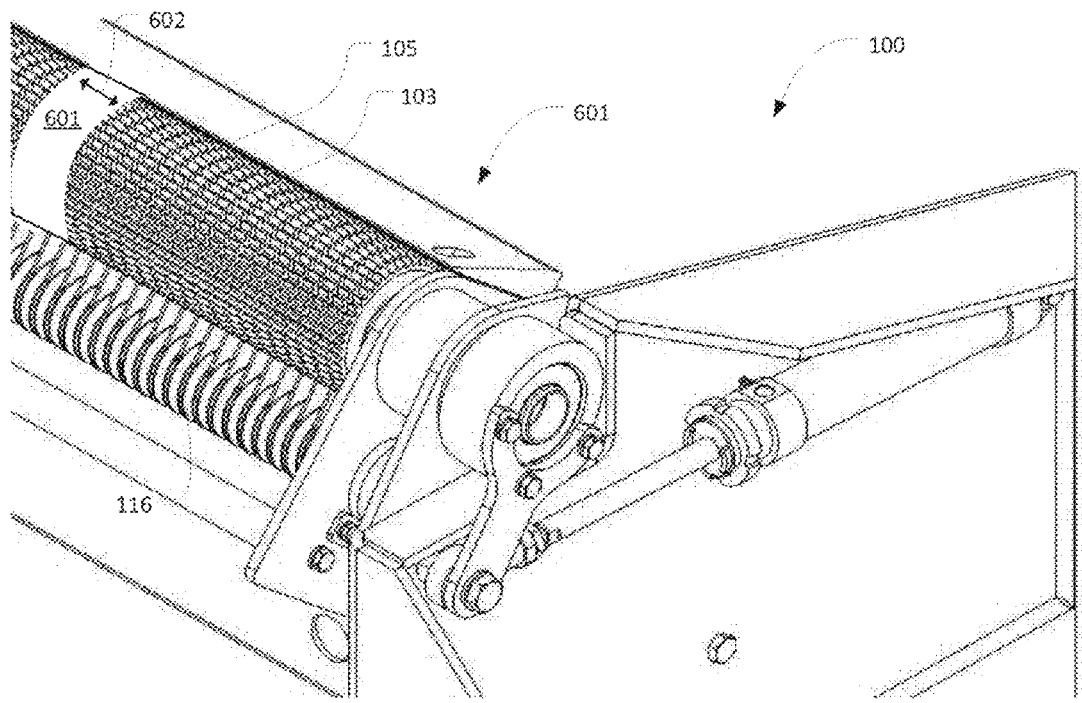
FIG. 6 shows a skinning device according to the present invention, further comprising an arc shaped plate structure essentially following the arc shape of the motor driven tooth roll and adapted to be positioned or mounted in front and adjacent to the motor driven tooth roll and the cutting blade so as to limit the skin removal of the incoming carcass or carcass part.

FIG. 6 shows a skinning device according to the present invention, e.g. the skinning device 100 shown in FIG. 1, where the perspective view of a skinning device 100 according to the present invention for removing skin from an animal carcass or carcass parts when conveyed by a conveyor means. In this embodiment, the skinning device 100 further comprises an arc shaped plate structure 601 that essentially follows the circumferential contour of the motor driven 103 tooth roll and may be positioned or mounted in front and adjacent to the motor driven tooth roll and the cutting blade 105. The arc shaped plate structure 601 is adapted to limit the skin removal of the incoming carcass or carcass part and restricts the skinning as the housing of the skinning device moves from the first angular position to the second angular position, as discussed previously in relation to FIG. 4.

By moving the arc shaped plate structure 601 in a direction as indicated by the arrow 602, which may also be referred to as a guard plate in front of the tooth roll and the cutting blade, it is possible to protect the skin, or fat, on e.g. the top or the bottom of the animal carcass or carcass part. In this way it is possible to limit e.g. the height of the de skinning process. In this case, the position of the arc shaped plate structure 601 may result in that only the skin of lower side 601 of an incoming animal carcass or carcass part (not shown) is removed.

The arc shaped plate structure 601 may be slidable mounted to the skinning device where the position of the arc shaped plate structure may easily be adjusted manually or automatically via appropriate adjustment mechanism (not shown here). Thus, the exact position of the arc shaped plate structure 601 may be fully controlled based e.g. on a pre-order of a customer.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A skinning device for removing skin from an animal carcass or carcass parts when conveyed by a conveyor means, comprising:
    a frame,
    a housing rotatably mounted on the frame using a rotation mechanism;
    a motor driven tooth roll continuously rotable around an axis of rotation;
    a support structure mounted on the housing encasing at least a portion of the tooth roll;
    a cutting blade positioned between the support structure and the tooth roll in a fixed position in relation to the support structure; and
    a sensing structure for sensing incoming animal carcass or carcass parts, wherein the rotation mechanism is operably connected to the housing and adapted to execute, in response to a reaction from the sensing structure, a movement of the housing including rotational movement around an longitudinal axis of the tooth roll from a first angular position to a second angular position, the first angular position being a starting position where the tooth roll, during operation of the device, engages the skin of an incoming animal carcass or carcass part and pulls the skin towards the cutting blade when the tooth roll is continuously rotated around its axis of rotation, where subsequently the housing is moved from the first angular position towards the second angular position such that the animal carcass or carcass part is moved over the skinning device while the skin is being pulled between the support structure and the tooth roll causing simultaneous removal of the skin from the animal carcass or carcass part upon reaching the second angular position.

2. The skinning device according to claim 1, wherein the rotation mechanism is further adapted to, in response to a control command, to execute a movement of the housing to a third angular bypass position prior to engaging with an incoming animal carcass or carcass part, the third angular bypass position being a position where a cutting edge of the cutting blade does not engage with the incoming animal carcass or carcass part.

3. The skinning device according to claim 1, wherein the sensing structure comprises a lever arm adapted to, upon coming into contact with an incoming animal carcass or carcass part, trigger the rotation mechanism to move the housing from a second angular position back to a first angular starting position.

4. The skinning device according to claim 1, wherein the support structure extends along and in proximity to the motor driven tooth roll and comprises an elongated narrow end positioned adjacent to the tooth roll pointing opposite to the rotational direction of the tooth roll, and where the cutting blade is mounted to the support structure such that the cutting blade protrudes outwardly from the elongated narrow end in a direction substantially tangentially to a circumference of the tooth roll.

5. The skinning device according to claim 4, wherein the support structure comprises a shoe having an arc-shape essentially following the shape of the motor driven tooth roll, and a clamp mounted to the shoe, where at least one of the shoe and the clamp comprises a groove, and where a portion of the cutting blade is positioned or clamped in the groove between the clamp and the shoe.

6. The skinning device according to claim 1, wherein the rotation mechanism comprises a rotation axis operably connected to a rotation axis of the motor driven tooth roll or that is an integral part of the axis of the motor driven tooth roll, a pneumatic or hydraulic system comprising a piston that is slidable mounted to a housing for providing back and forth movement of the piston and a connection member for connecting the piston to the rotation axis such that the back and forth movement of the piston becomes transferred to a rotational movement of the housing.

7. The skinning device according to claim 1, wherein the motor driven tooth roll comprises plurality of tooth wheels arranged in axially spaced apart arrangement with a mutual distance between adjacent tooth wheels to define a space there between, where the tooth wheels having circumferentially arranged teeth projecting outwardly therefrom so as to facilitate the pulling of the skin from the animal carcass or carcass part towards the cutting blade.

8. The skinning device according to claim 7, further comprising plurality of strippers arranged in the space between the tooth wheels and that at least party circumferentially surround the space between adjacent tooth wheels, each of the plurality of strippers comprises a tail part pointing distally away from the motor driven tooth roll and the support structure so as to guide the skin removed from the animal carcass or carcass part away from the skinner device.

9. The skinning device according to claim 1, further comprising an arc shaped plate structure essentially following the circumferential contour of the motor driven tooth roll and being positioned or mounted in front and adjacent to the motor driven tooth roll and the cutting blade, the arc-shaped plate structure being adapted to limit the skin removal of the incoming carcass or carcass part as the housing moves from the first angular position to the second angular position.

10. A system including the skinning device of claim 1 and for processing animal carcass or carcass parts including skinning the animal carcass or carcass parts, the system further comprising:
  an overhead transport-conveyor system comprising:
    a track,
    a plurality of carriers slideable mounted to the tracks, each of the carriers being adapted to carry an animal carcass or carcass part,
    a driving unit coupled to the plurality of carriers for advancing the plurality of carriers along the track,
  an input unit for receiving a control command including processing instructions for incoming animal carcass or carcass parts, the processing instructions including instructions specifying whether or not the incoming animal carcass or carcass parts are to be skinned or not,
  a control unit operably connected to the rotation mechanism of the skinning device for operating the movement of the housing of the skinning device in accordance with the control command.

11. The system according to claim 10, wherein in case the control command indicates that an incoming carcass or carcass part is not to be skinned, the control unit instructs the rotation mechanism to execute a movement of the housing to a third angular bypass position of the skinning device prior to engaging with the incoming animal carcass or carcass part, the third angular bypass position being a position where the cutting edge of the cutting blade does not engage with the incoming animal carcass or carcass part.

12. A method of skinning an incoming animal carcass or carcass part in a skinning device according to claim 1, comprising:
  positioning the housing in the first angular position, where upon that the tooth roll engages the skin of an incoming animal carcass or carcass part and pulls it towards the cutting blade,
  moving the housing from the first angular position towards the second angular position such that the tooth roll and the cutting blade is in continuous physical contact with the animal carcass or carcass part while simultaneously removing the skin therefrom during the moving from the first angular position towards the second angular position, and
  moving the housing from the second angular position back to the first angular position before a subsequent animal carcass or carcass part arrives at the skinning device.

13. The method according to claim 12, wherein the method further comprises, in response to a control command to bypass an incoming carcass or carcass part from skinning, adjusting the angular position to a third angular bypass position prior to engaging with subsequent incoming animal carcass or carcass part, the third angular position being a bypass position where the cutting edge of the cutting blade does not engage with the incoming animal carcass or carcass part.

14. The method according to claim 12, wherein moving the housing from the second position back to the first position is triggered via a physical contact between an incoming animal carcass or carcass part with the lever arm of the sensing structure of the skinning device.

15. The method according to claim 12, wherein the first angular position is a position where the angle between a reference axis pointing opposite to the conveying direction of the animal carcass or carcass part and the cutting blade is less than 90° and/or the second angular position is a position where the angle between a reference axis pointing opposite to the conveying direction of the animal carcass or carcass part and the cutting blade is equal or larger than 90°, and/or the third angular bypass position is a position where the angle between a reference axis pointing opposite to the conveying direction of the animal carcass or carcass part and the cutting blade is larger than 90°.

* * * * *